United States Patent [19]

Sato

[11] Patent Number: 4,684,143
[45] Date of Patent: Aug. 4, 1987

[54] TWO-WHEELED VEHICLE WITH HYDRAULIC TRANSMISSION

[76] Inventor: Yasunori Sato, 2-1-607, Ohkura 1-Chome, Setagaya-Ku, Tokyo, Japan

[21] Appl. No.: 844,549

[22] Filed: Mar. 27, 1986

[30] Foreign Application Priority Data

Apr. 5, 1985 [JP] Japan .................................. 60-71065

[51] Int. Cl.⁴ ............................................ B62M 19/00
[52] U.S. Cl. .................................... 280/216; 180/224; 180/305; 280/260; 417/273; 418/29; 418/61 R; 418/164
[58] Field of Search ............... 280/216, 259, 215, 201, 280/214, 260; 180/218, 224, 305, 307, 308; 60/452, 423, 483; 418/61 R, 29, 161, 164; 417/273, 313

[56] References Cited

U.S. PATENT DOCUMENTS

| | | | |
|---|---|---|---|
| 1,370,516 | 3/1921 | Carmody | 417/273 |
| 2,471,939 | 5/1949 | Davis | 417/273 |
| 2,545,315 | 3/1951 | Sproull | 417/273 |
| 4,290,621 | 9/1981 | Davey | 280/216 |
| 4,546,990 | 10/1985 | Harriger | 280/216 |

FOREIGN PATENT DOCUMENTS

| | | | |
|---|---|---|---|
| 537981 | 7/1959 | Belgium | 280/216 |
| 838115 | 9/1951 | Fed. Rep. of Germany | 280/216 |
| 3141676 | 5/1983 | Fed. Rep. of Germany | 280/201 |
| 817538 | 7/1959 | United Kingdom | 280/216 |

*Primary Examiner*—John J. Love
*Assistant Examiner*—Everett G. Diederiks, Jr.
*Attorney, Agent, or Firm*—Parkhurst & Oliff

[57] ABSTRACT

A two-wheeled vehicle such as a bicycle includes a variable displacement fluid pump such as a radial plunger pump provided at a crankshaft of pedals and a fixed displacement fluid motor such as a gear motor at a rear wheel or a front wheel. The fluid pump and motor are connected through hydraulic passages. Plungers of the radial plunger pump are driven by a cam assembly whose eccentricity is adjustable by means of an eccentricity control means dependent upon the load acting upon the vehicle in a stepless manner, so that the speed of the vehicle can be changed in a stepless manner. Moreover, the vehicle includes automatic speed change means which automatically change the eccentricity of the eccentric cam assembly according to hydraulic pressure of the variable displacement fluid pump, so that the speed of the vehicle can be automatically changed.

10 Claims, 14 Drawing Figures

FIG_2

FIG_3

FIG_4

FIG_5

FIG_8

FIG_10
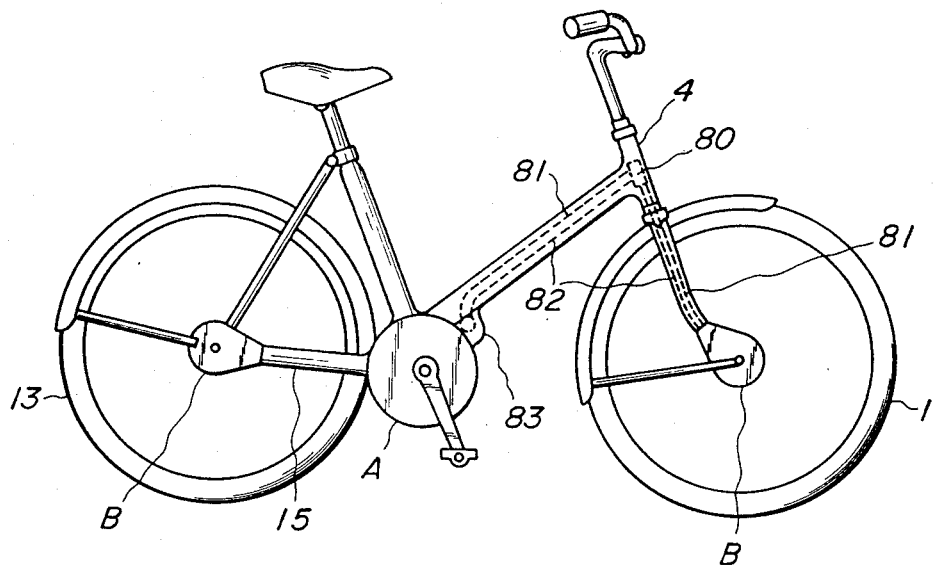
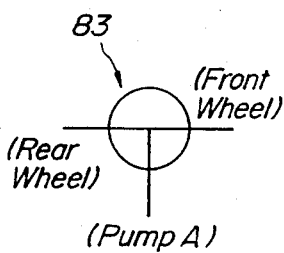
FIG_11a
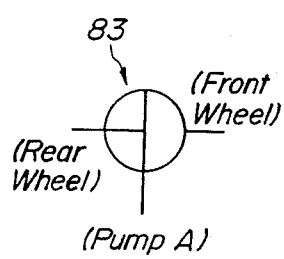
FIG_11b
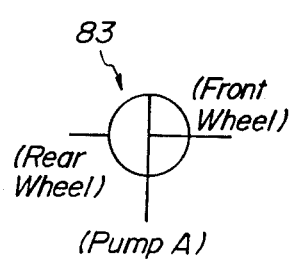
FIG_11c

FIG_12
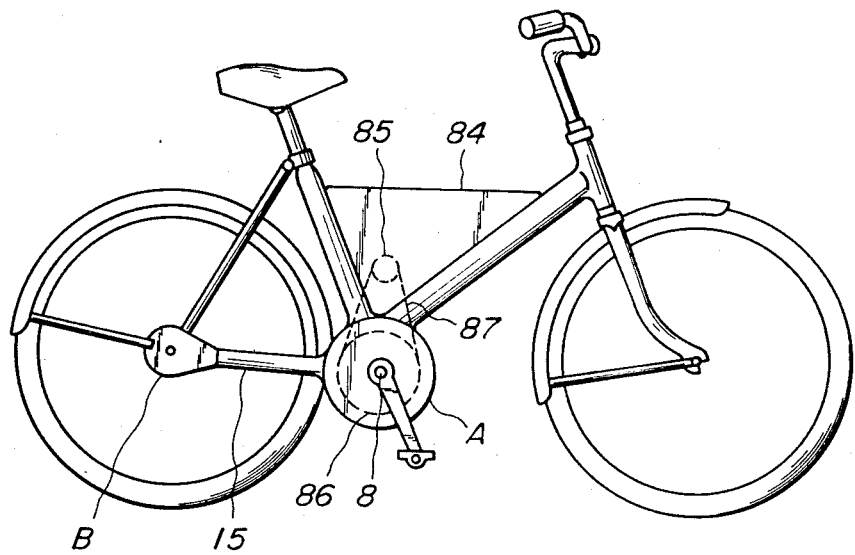

TWO-WHEELED VEHICLE WITH HYDRAULIC TRANSMISSION

BACKGROUND OF THE INVENTION

This invention relates to a two-wheeled vehicle such as a bicycle, motorcycle and the like and more particularly to a two-wheeled vehicle with a hydraulic transmission.

A chain transmission system has been widely used for transmission of two-wheeled vehicles. It has been practically used to shift a chain from one to the other of multiple stage sprockets to change speeds of a two-wheeled vehicle.

Speed change means other than the above prior art have been disclosed, for example, in Japanese Patent Application Publication No. 1,722/59 and Japanese Laid-open Patent Application No. 54-93,754.

In the above chain shifting system, although stepwise speed change is effected, stepless speed change is impossible. Moreover, the speed change devices disclosed in the Japanese Patent Application Publication No. 1,722/59 and the Japanese Laid-open Patent Application No. 54-93,754 are theoretically capable of performing a stepless speed change. However, these devices have not been practically used owing to pulsation and noise produced in operation and difficulty to obtain sufficient transmission ratio.

Recently, as cross-country cycling and mountain cycling have become popular, bicycles as sports bicycles suitable for bad roads have been expected. Although it has been known that front wheel drive is very effective on bad road, it is impossible to realize the front wheel drive in a chain-drive bicycle because a front wheel always changes its direction with handle bars.

SUMMARY OF THE INVENTION

It is a principal object of the invention to provide a two-wheeled vehicle which eliminates all the disadvantages of the prior art and which has a stepless speed change device having a wide range of transmission ratio and operating with less noise and pulsation.

It is another object of the invention to provide an improved two-wheeled vehicle capable of changing the speed in stepless and automatic manner.

It is a further object of the invention to provide a two-wheeled vehicle capable of driving a front wheel and both front and rear wheels.

In order to achieve these objects, a two-wheeled vehicle according to the invention comprises a variable displacement fluid pump provided at an input portion of a driving system for the vehicle and a fixed displacement fluid motor provided at an output portion of the driving system, said fluid pump and motor being connected through hydraulic passages, thereby driving the vehicle.

The variable displacement fluid pump is preferably a radial plunger pump whose plungers are driven by a cam assembly, the eccentricity of which is adjustable.

In a preferred embodiment, the cam assembly comprises an inner eccentric cam substantially in the form of a cylinder eccentrically fixed to a center shaft and an outer eccentric cam substantially in the form of a cylinder snugly rotatably and eccentrically fitted on the inner eccentric cam and the plunger pump comprises eccentricity control means for changing the eccentricity of the eccentric cam assembly. The eccentricity control means comprises an inner internal gear integral with the inner eccentric cam and having a center coincident with the center shaft, an outer internal gear rotatable together with the outer eccentric cam and having the same number of teeth and the same pitch diameter as those of the inner internal gear and located side by side concentric to and rotatable relative to the inner internal gear, a center gear rotatable on the center shaft, a fixed gear rotatable on a fixed member and in mesh with the center gear and one of the internal gears, and a rocking gear rotatable on a free end of a rocking arm rotatably supported by the center shaft and in mesh with said center gear and the other of the internal gears, thereby adjusting the eccentricity of the eccentric cam assembly in stepless manner by rocking the rocking arm.

In a preferred embodiment of the invention, there is provided a piston cylinder assembly comprising a cylinder whose head is pivotally connected to a frame and supplied with hydraulic pressure from the variable displacement hydraulic pump, a piston slidable in the cylinder by the hydraulic pressure from the pump, a piston rod connected to the piston, and a spring for returning the piston moved by the hydraulic pressure, and an extended end of the piston rod being connected to the arm such that the arm is moved by the piston rod moved by the hydraulic pressure.

In another embodiment, the fixed displacement fluid pump is a gear pump including a pair of gears. A pitch diameter of one of the gears is larger than that of the other of the gears, and the gear pump comprises a gear casing integrally formed at a center with a shaft sleeve which is fixedly fitted on a driving wheel spindle and a one-way clutch for connecting the driving wheel spindle to an output shaft of the large diameter gear.

According to the invention, the front wheel drive is achieved by providing the fixed displacement fluid motor at a front wheel of a bicycle. Two fixed displacement fluid motors may be provided at front and rear wheels to drive both the wheels. In this case, a three-way valve is provided in the hydraulic passages to select any one of front wheel, rear wheel and both wheel drive.

The invention will be more fully understood by referring to the following detailed specification, taken in connection with the appended drawings.

BRIEF DESCRIPTION OF THE DRAWINGS

FIG. 10 is a side view of a further embodiment of the bicycle according to the invention;

FIGS. 11a, 11b and 11c are schematic view of a three-way valve used in the bicycle shown in FIG. 10; and FIG. 12 is a side view of a bicycle with a small engine illustrating a further embodiment of the invention.

DESCRIPTION OF THE PREFERRED EMBODIMENTS

Figure 1:
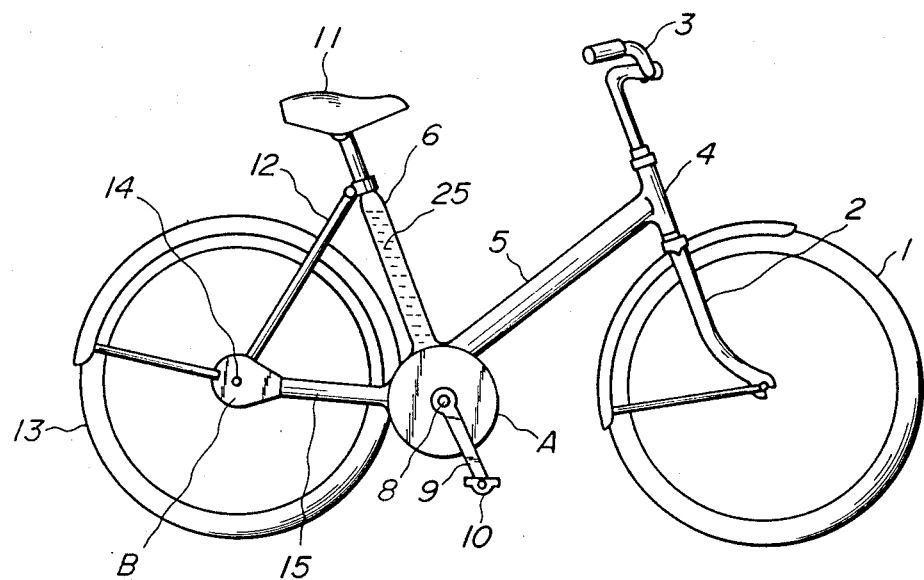
FIG. 1 is a side view of a bicycle of one embodiment of the invention.

FIG. 1 illustrates a bicycle equipped with a hydraulic transmission according to the invention which comprises a front wheel 1, fork blades 2, handle bars 3, a head tube 4, a down tube 5, a seat tube 6, a bottom bracket 7 (FIG. 3), a crankshaft or bottom bracket spindle 8, a crank arms 9, crank pedals 10, a saddle 11, seat stays 12, a rear wheel 13 and a rear wheel spindle 14.

According to this embodiment, a variable displacement type hydraulic pump A formed in a disc-like shape is mounted concentrically to the crankshaft 8 in an input portion of a transmission of a bicycle, while a fixed displacement type hydraulic motor B is mounted in an output portion of the transmission with the aid of the rear wheel spindle 14. The hydraulic pump A and motor B are connected with each other through a connecting member 15 including a delivery hydraulic passage and a suction hydraulic passage therein. This connecting member may be used as a chain stay. The seat tube 6 is preferably used as an oil reservoir 25.

FIGS. 2-6 illustrate preferred embodiments of the variable displacement type hydraulic pump A, an eccentricity control device C associated therewith, and an automatic speed change device D cooperating with the control device C.

The variable displacement type hydraulic pump A comprises a casing 16 in the form of a disc whose outer center hole 17 is fitted on a hub 9a of the crank arm and whose inner center hole 18 has a diameter permitting an outer eccentric cam (later explained) to be rotated. In the pump casing 16, there are a plurality (eight in this embodiment) of plunger type suction and exhaust assemblies extending radially from the crankshaft 8 located at the center of the casing. Each of the plunger type suction and exhaust assembly comprises a cylinder bore 19, a plunger 20, a cam follower 21 rotatably supported at an inner end of the plunger 20 and a coil spring 22 for uring the plunger 20 inwardly. Reference numeral 23 denotes a suction hydraulic passage annularly provided in an outer circumferential portion of the pump casing 16 and communicating through a pipe 24 with the oil reservoir 25 in the seat tube 6. Reference numeral 26 denotes a delivery hydraulic passage juxtaposed with the passage 23 in the outer circumferential portion of the casing 16. The hydraulic passages 23 and 26 communicate with each other through the cylinder bores 29 and check valves 27 on suction sides and check valves 28 on delivery sides. Each the check valve comprises a ball 27a or 28a and a coil spring 27b or 28b. Oil passages 29 shown in FIG. 2 serve to return leaked oil into the suction hydraulic passage 23.

An inner eccentric cam 30 is fixed to the crankshaft 8 by means of a key 31. The inner eccentric cam 30 has a disc 32 positioned out of the pump casing 16 and integrally formed with an inner internal gear 33. The outer eccentric cam 34 is rotatably fitted on the inner eccentric cam 30. The outer eccentric cam 34 is integrally formed with a projection 35 (FIG. 4) positioned between the outer surface of the pump casing 16 and the disc 32. A disc 37 is formed with a groove 36 adapted to be slidably fitted with the projection 35 with clearances and is further formed with an outer internal gear 38.

The outer internal gear 38 has the same number of teeth and the same pitch diameter as those of the inner internal gear 33 and is juxtaposed with and is concentrically rotatable relative to the inner internal gear 33.

Figure 4:
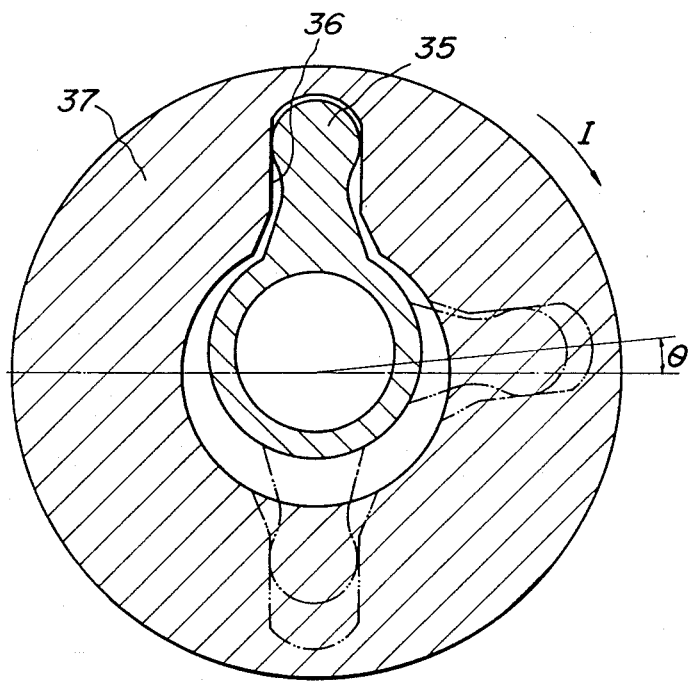
FIG. 4 is a sectional view taken along the line IV—IV in FIG. 3.
Figure 5:
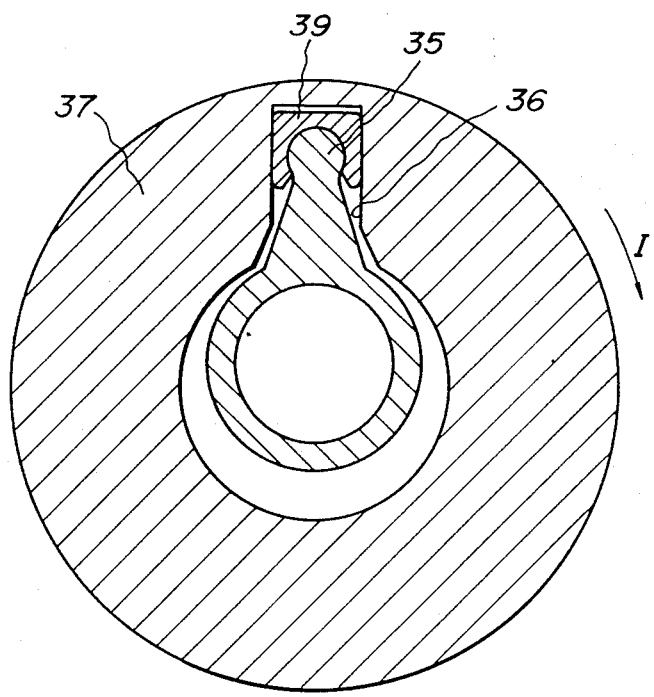
FIG. 5 illustrates a modification of the arrangement shown in FIG. 4.

In the embodiment shown in FIG. 4, a rounded end of the projection 35 is in line contact with the groove 36. In order to enlarge the contact area between the projection 35 and the groove 36, a slide shoe 39 may be interposed therebetween as shown in FIG. 5.

A center gear 40 is rotatably fitted on the crankshaft 8. a fixed gear 41 is rotatably supported by a bracket 42 extending from the bottom bracket 7 so as to be in mesh with the center gear 40 and the outer internal gear 38. A rocking gear 43 is rotatably supported by a free end of a rocking arm 44 whose bottom is rotatably fitted on the crankshaft or bottom bracket spindle 8 so that the rocking gear 43 is in mesh with the center gear 40 and the inner internal gear 33. The bottom of the arm 44 is formed with a gear 45 which is in mesh with a sector gear 46 formed integrally with an eccentricity operating lever 47 whose mid portion is fixed by a shaft 47a to a frame of the bicycle. The gear assembly thus constructed forms the eccentricity control device C.

Figure 6:
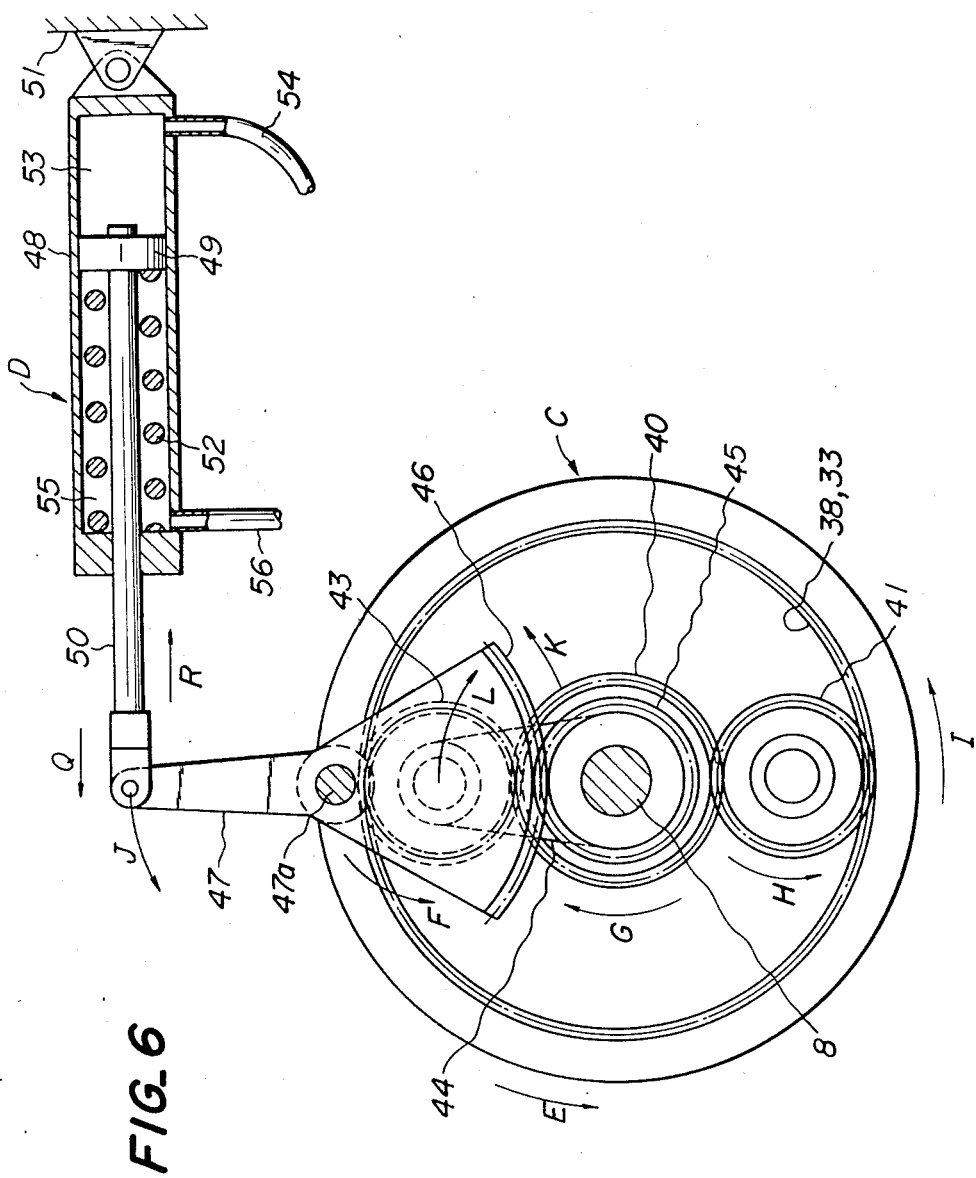
FIG. 6 is a partial sectional view taken along the line VI—VI in FIG. 3.

As shown in FIG. 6, the eccentricity operating lever 47 is connected to a rod end of a piston rod 50 having a piston 49 in a hydraulic cylinder 48 for constituting the automatic speed change device D. The hydraulic cylinder 48 is rockably connected to the frame 51 of the bicycle. A coil spring 52 serves to return the piston 49 in the cylinder 48. A pressure chamber 53 on opposite side of the coil spring 52 with respect to the piston 49 is communicated with the delivery hydraulic passage 26 of the hydraulic pump A through a flexible tube 54 as shown in two-dots-and-dash lines in FIG. 3, thereby returning leaked oil to the oil reservoir 25.

Figure 7:
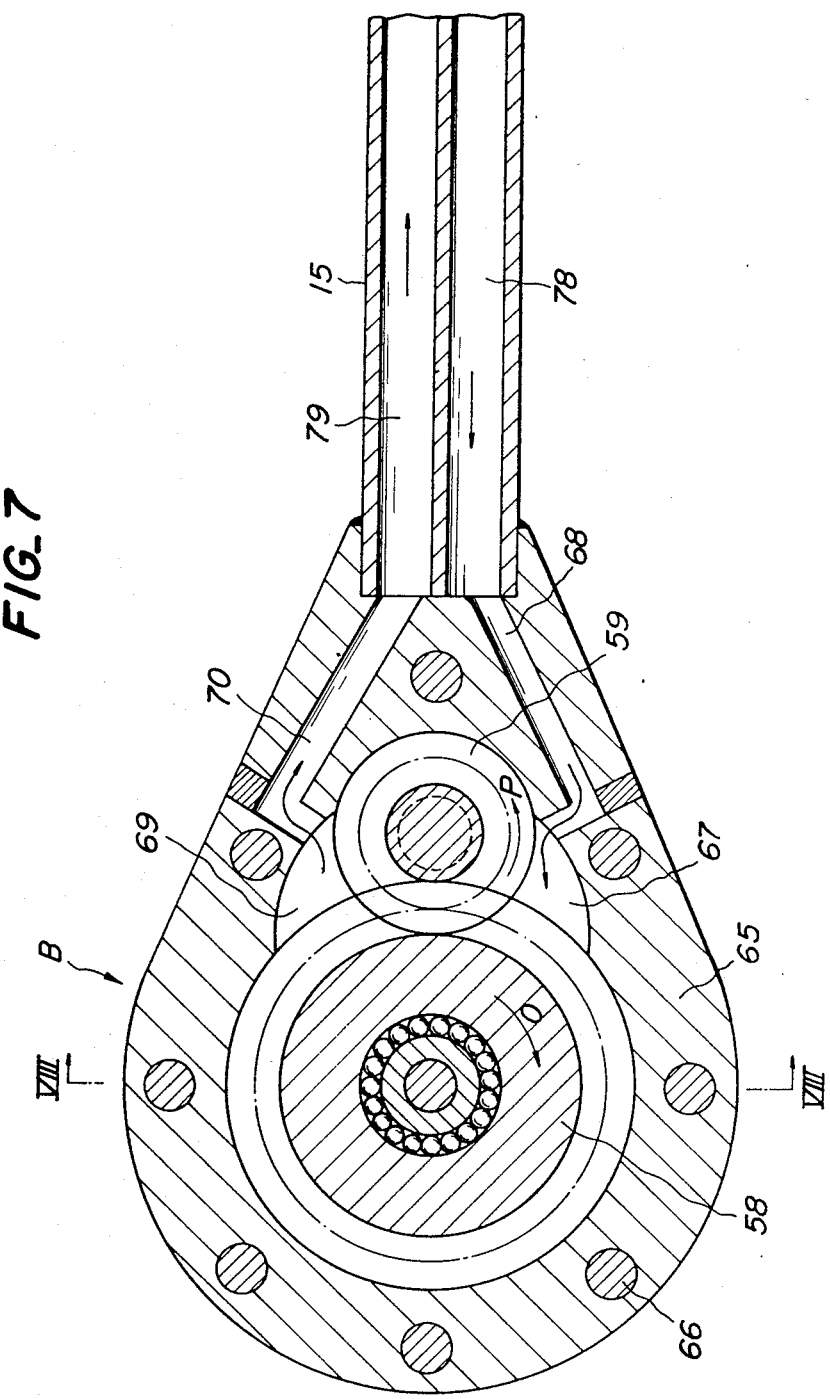
FIG. 7 is a sectional view of a fixed displacement hydraulic pump used in the invention.
Figure 8:
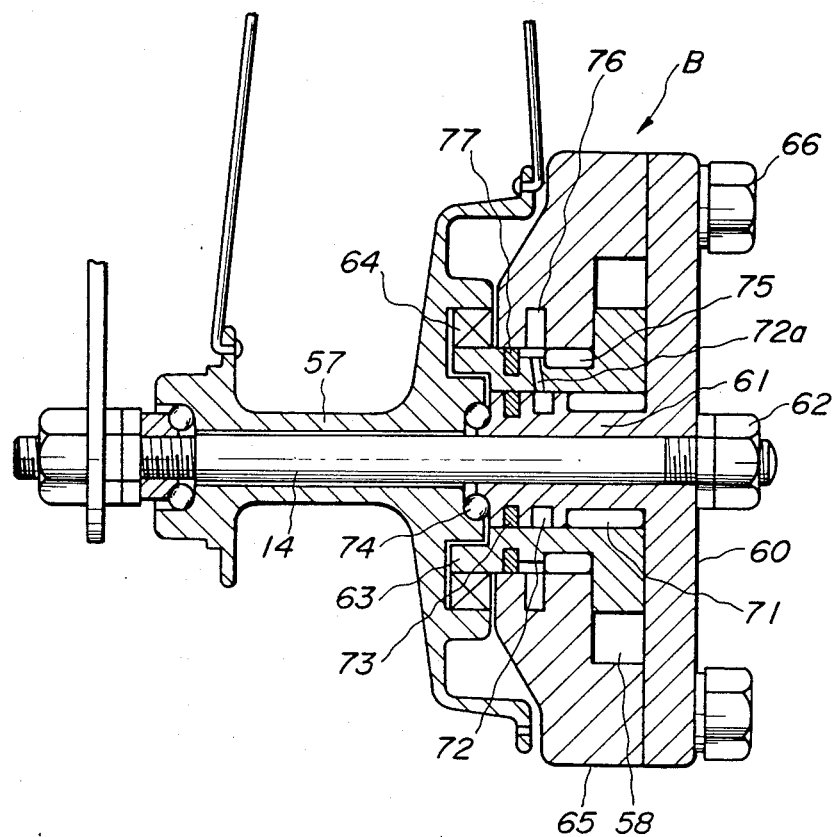
FIG. 8 is a sectional view taken along the line VIII—VIII in FIG. 7.

FIGS. 7 and 8 illustrate one embodiment of the fixed displacement type hydraulic motor B fitted on the rear wheel spindle 14 of a bicycle to drive a rear wheel hub 57. This hydraulic motor is a gear motor comprising a pair of gears 58 and 59. A diameter of the gear 58 is much larger than that of the gear 59. A gear casing cover 60 is provided with a shaft sleeve 61 which is located at the center of the large diameter gear 58 and fitted and fixed on the rear wheel spindle 14 by means of a nut 62. An output shaft 63 of the large diameter gear 58 and is connected to the rear wheel hub 57 through a one-way clutch 64. The gear casing cover 60 is connected by bolts 66 to a gear casing 65 formed with a pressure side recess 67, a pressure side passage 68, an exhaust side recess 69 and a return passage 70.

As shown in FIG. 8, the hydraulic motor B further comprises needle rollers 71 interposed between the shaft sleeve 61 and the large diameter gear 58, annular grooves 72 formed in an outer circumferential portion of the shaft sleeve 61 as an oil reservoir, a sealing ring 73, a ball bearing 74, needle rollers 75 interposed between the output shaft 63 of the gear 58 and the gear casing 65, an annular groove 76 formed in an inner surface of the large diameter gear 58 as an oil reservoir, and a sealing ring 77 in an annular groove formed in the output shaft 63.

As the leaked oil tends to be accumulated in the annular grooves 72 and 76, the oil in the annular groove 72 is introduced through an aperture 72a into the annular groove 76 and the coil in the annular groove 76 is introduced into the return passage 70 through an oil passage (not shown) formed in the gear casing 65.

As shown in FIG. 1, the variable displacement type hydraulic pump A and the fixed displacement type hydraulic motor B are connected by the connecting member 15 which also serves as a chain stay. The connecting member 15 is formed wtih a delivery hydraulic passage 78 and a suction hydraulic passage 79. The delivery hydraulic passage 26 of the hydraulic pump A is connected to the pressure side passage 68 of the hydraulic motor B through the delivery hydraulic passage 78 of the connecting member 15, while the return passage 70 of the hydraulic motor is connected to the suction hydraulic passage 23 of the hydraulic pump A through the suction hydraulic passage 79 of the connecting member 15.

The operation of the arrangement above described will be explained hereinafter. When the pedals 10 of the bicycle as shown in FIG. 1 are pressed to rotate the crankshaft or bottom bracket spindle 8, the inner eccentric cam 30 fixed to the crankshaft 8 through the key 31 is rotated together with the crankshaft 8. As the rotation of the inner eccentric cam 30 causes the inner internal gear 33 formed integrally therewith to rotate in a direction shown by an arrow E in FIG. 6, the rocking gear 43 in mesh with the inner internal gear 33 is rotated in a direction shown by an arrow F so long as the arm 44 is stationary. As the rotation of the rocking gear 43 causes the center gear 40 engaging the gear 43 to rotate in a direction shown by an arrow G, so that the fixed gear 41 in mesh with the center gear 40 is rotated in a direction shown by an arrow H, with the result that the outer internal gear 38 in mesh with the fixed gear 41 is rotated in a direction shown by an arrow I. In this case, the rotations of the gears 43 and 41 are quite the same, so that the inner and outer internal gears 33 and 38 are rotated in unison.

When the outer internal gear 38 is rotated, the disc 37 shown in FIG. 4 or 5 is rotated in a direction shown by an arrow I, so that the projection 35 engaging the groove 36 (through the slide shoe 39 in FIG. 5) is also rotated in the direction shown by the arrow I. As the projection 35 is integrally formed with the outer eccentric cam 34, the outer and inner eccentric cams 34 and 30 are rotated substantially in unison. The reason why "substantially" in unison is used is because when the projection 35 has been rotated approximately 90° as shown by the phantom lines in FIG. 4, the disc 37 is rotated behind the projection 35 by an angle $\theta$ (approximately 6° in this embodiment). In rotated phases 180° and 360° of the projection, however, the projection 35 and the disc 37 are completely coincident with each other in rotated angles, it may be considered that the inner and outer eccentric cams 30 and 34 are rotated in unison. In order to make small the angle $\theta$, the eccentricity of the inner eccentric cam 30 should be set at a minimum required value.

In order to change the resultant eccentricity of the inner and outer eccentric cams 30 and 34, the eccentricity operating lever 47 as shown in FIG. 6 is moved, for example, in a direction shown by an arrow J, so that the sector gear 46 is rotated about the shaft 47a in a direction shown by an arrow K to cause the gear 45 in mesh therewith to rotate in the direction shown by the arrow G, with the result that the arm 44 integral with the gear 45 is rotated in a direction shown by an arrow L. If the spindle 8 is stationary, the inner internal gear 33 is also stationary, so that when the arm 44 is rotated in the direction L, the rocking gear 43 is revolved in the direction L about the crankshaft 8, while rotating about its axis in the direction F. As the result, the center gear 40 is rotated in the direction G, so that the fixed gear 41 is rotated in the direction H and the outer internal gear 38 in mesh therewith is rotated in the direction I. In this case, as above described, because the inner internal gear 33 is stationary, the outer internal gear 38 is rotated through required angles relative to the inner internal gear 33. In other words, the outer eccentric cam 34 is rotated relative to the inner eccentric cam 30.

Figure 2:
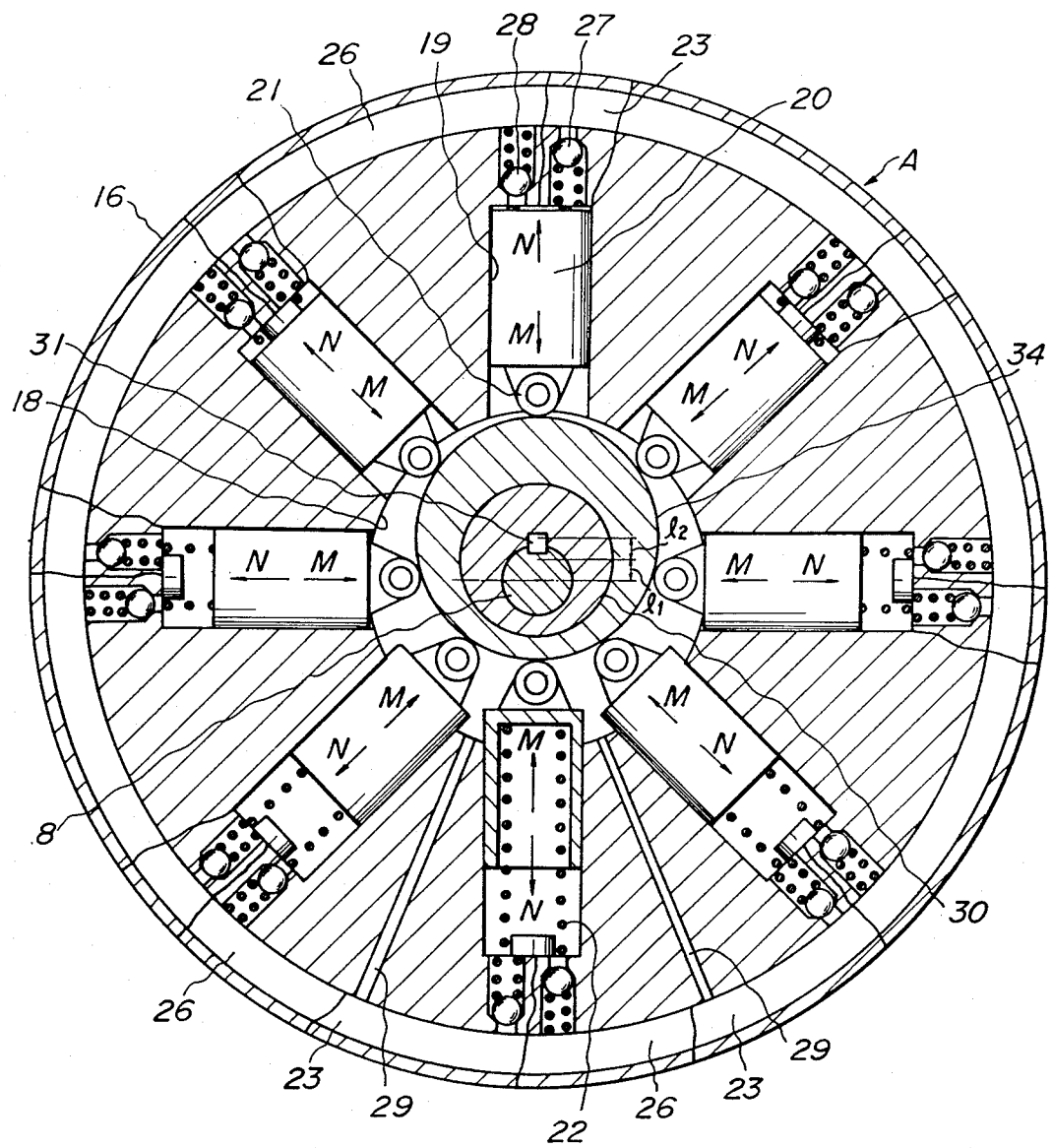
FIG. 2 is a sectional view of a variable displacement hydraulic pump used in the invention.
Figure 3:
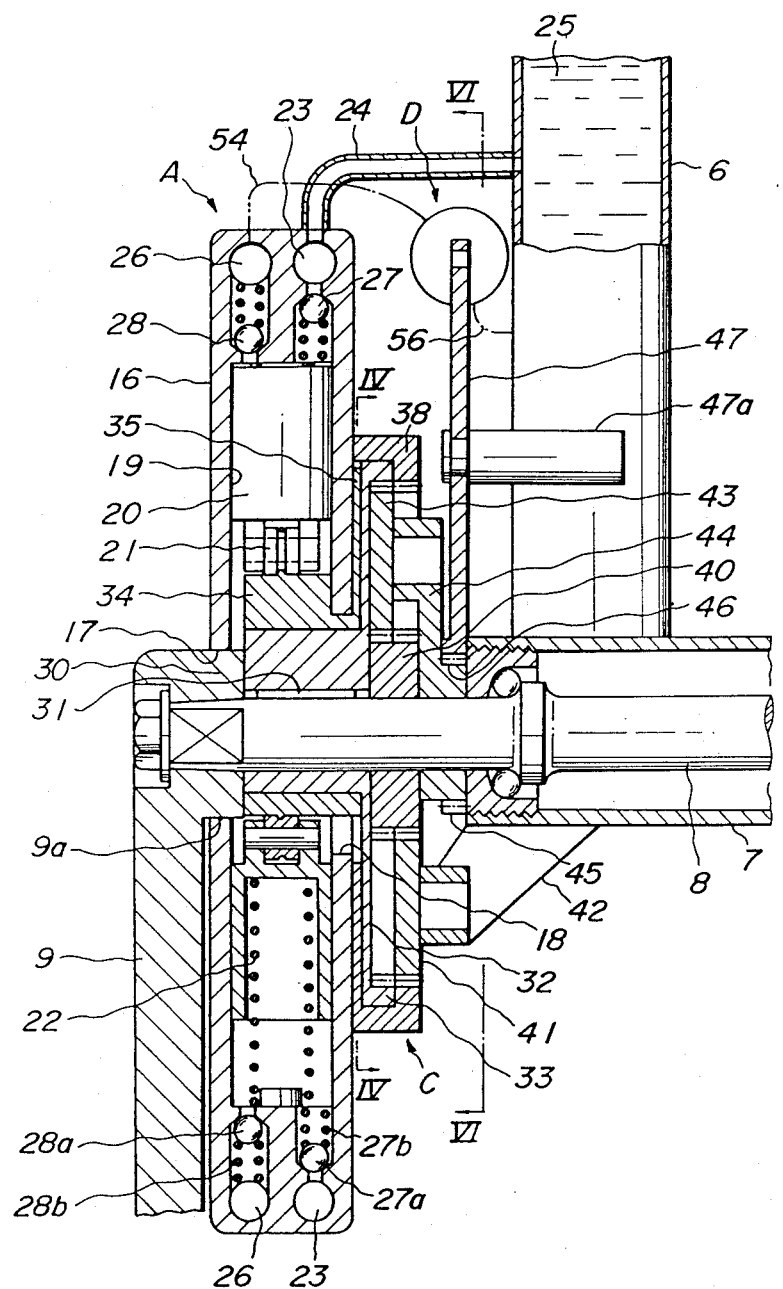
FIG. 3 is a longitudinal sectional view of the pump shown in FIG. 2.

FIGS. 2 and 3 illustrate the maximum resultant eccentricity between the cams 30 and 34. When the outer eccentric cam 34 is rotated starting from the position shown in FIGS. 2 and 3 relative to the inner eccentric cam 30, the resultant eccentricity becomes smaller successively.

Assuming that the eccentricity of the inner eccentric cam 30 is $l_1$ and the eccentricity of the outer eccentric cam 34 relative to the inner eccentric cam 30 is $l_2$, the cams shown in FIG. 2 are set as $l_1 = _2$. When the outer eccentric cam 34 is rotated through 180° from the position of the maximum resultant eccentricity relative to the inner eccentric cam 30, the resultant eccentricity becomes zero.

In other words, the resultant eccentricity of the inner and outer eccentric cams 30 and 34 can be set arbitrarily between the maximum value as shown in FIGS. 2 and 3 and zero.

Although the operation has been explained in the event that the spindle 8 is stationary, the operation can be effected in the same manner even if the spindle is being rotated.

When the inner and outer eccentric cams 30 and 34 are rotated in unison by the rotation of the crankshaft 8, the respective plungers 20 are reciprocally moved in the cylinder bores 19 in the directions shown by arrows M and N in FIG. 2, by the camming action with the aid of the cam followers 21 brought in contact with the outer eccentric cam 34 by the coil springs 22. When the plunger 20 is moved in the direction M, the oil enters the cylinder bore 19 from the suction hydraulic passage 23 through the check valve 27. On the other hand, when the plunger 20 is moved in the direction N, the oil is exhausted into the delivery hydraulic passage 26 through the check valve 28. While the spindle 8 is rotated through 180°, each plunger 20 completes its one cycle, so that the oil is delivered into the delivery hydraulic passage 26 by the plunger.

The delivered oil enters the pressure side recess 67 through the delivery hydraulic passage 78 of the connecting member 15 and the pressure side passage 68 of the hydraulic motor B shown in FIG. 7. Accordingly, the large diameter gear 58 is rotated in a direction shown by an arrow O and the small diameter gear 59 is rotated in a direction shown by an arrow P in FIG. 7.

The rotation of the large diameter gear 58 is transmitted through the one-way clutch 64 to the rear wheel hub 57, thereby driving the bicycle.

When the gears 58 and 59 are rotated as above described, the oil flows into the return passage 70 through the exhaust side recess 69. The oil in the return passage 70 is then returned into the suction hydraulic passage 23 of the hydraulic pump A through the suction hydraulic passage 79 of the connecting member 15.

All the oil which leaks during the above operation is returned to the oil passage on the suction side through the oil passages 29, the annular grooves 72 and 76 and passages (not shown) communicating therewith in the casing, so that there is no risk of the oil flowing out of the hydraulic system.

As above described, the oil reservoir 25 is provided in the seat tube 6 and communicated with the suction hydraulic passage 23 of the hydraulic pump A. Therefore, even if a little amount of oil leaks out of the hydraulic system, this bicycle can be used for a long period without any replenishment of oil because of oil supply from the reservoir 25.

Moreover, the hydraulic motor B uses only the two sealing rings for sealing the shaft, so that it operates with high transmission efficiency because of low rotating frictional resistance of the gear 58.

Furthermore, the reason why the gear 58 has the larger diameter and the gear 59 has the smaller diameter is that the gear 58 integral with the output shaft 63 is required to have a large diameter because it is mounted on the rear wheel spindle 14 and transmits the power to the rear wheel hub, and that the gear 59 is required to have a small diameter because the amount of the delivery oil from the motor B per one rotation should be restrained to somewhat little owing to a limitation in amount of delivery from the pump A per one rotation of the spindle 8 resulting from limitation in design of the pump.

With this arrangement, the hydraulic transmission can be minimized in its entirety and aesthetical appearance is improved.

A ratio of rotation of a rear or driving wheel to that of the crankshaft 8 is determined by a ratio of amount of delivery oil from the pump A to amount of exhausted oil from the motor B. The ratio of the delivery oil to the exhausted oil should be determined so as to be suitable for each bicycle. For example, if the maximum delivery amount of the pump A is 45 cc per one rotation and the amount of exhausted oil from the motor B is 15 cc per one rotation, the driving wheel is rotated three rotations per one rotation of the crankshaft 8 with the maximum eccentricity of the eccentric cams.

Accordingly, the bicycle with the hydraulic transmission according to the invention is able to change the rotating ratio of the driving wheel to the crankshaft from the maximum to zero by changing the eccentricity of the cam assembly to change the delivery amount of the hydraulic pump A. In other words, the ratio of rotation of the crankshaft to that of the driving wheel can be changed for example from 1:3 to 1:0 theoretically.

The operation of the automatic speed change device D in this embodiment will be explained hereinafter. The eccentricity operating lever can of course be manually operated. In the embodiment shown in FIG. 6, such an operation is effected automatically by introducing the pressure in the delivery hydraulic passage 26 of the pump A into the pressure chamber 53 in the cylinder 48 through the flexible tube 54.

When the crankshaft 8 is rotated by pressing the pedals of the bicycle in order to drive it, the hydraulic pressure in the delivery hydraulic passage 26 of the pump A increases or decreases dependently upon rotating torque acting upon the crank arms 9. In other words, the higher the resistance to driving of the bicycle, the higher is the hydraulic pressure acting in the pressure chamber 53, and while the lower the resistance, the lower is the pressure in the pressure chamber 53.

Accordingly, it is preferably to set the transmission in a manner that in a standard speed change ratio (an intermediate speed change ratio), the piston 49 is at a mid position of its operating range as shown in FIG. 6 and the thrust of the piston 49 caused by the hydraulic pressure in the pressure chamber 53 and the reaction force of the coil spring 52 are balanced. With this balanced condition, when the driving force increases from its standard value, the hydraulic pressure in the pressure chamber 53 becomes higher, so that the piston 49 and the piston rod 50 are moved in a direction shown by an arrow Q, with the result that the eccentricity of the cam assembly consisting of the eccentric cams 30 and 34 becomes smaller. Therefore, the delivery amount of the hydraulic pump A decreases to reduce the rotating ratio of the rear wheel 13 driven by the hydraulic motor B to the crankshaft 8 automatically. In other words, when the pressing of the pedals 10 of the bicycle becomes more difficult or requires larger force, a lower rotating ratio between the rear wheel 13 and the crankshaft 8 is automatically accomplished.

On the other hand, when the driving force decreases from its standard value or the pressing of the pedals 10 becomes easier, the pressure in the pressure chamber 53 becomes lower, so that the piston 49 and the piston rod 50 are moved in a direction shown by an arrow R in FIG. 6, with the result that the eccentricity of the cam assembly consisting of the eccentric cams 30 and 34 becomes larger and the delivery of the hydraulic pump A increases. Therefore, the rotating ratio of the rear wheel 13 driven by the hydraulic motor B to the crankshaft 8 automatically increases. In other words, when the pressing of the pedals becomes easier, a higher rotating ratio between the rear wheel 13 and the crankshaft 8 is automatically accomplished.

According to the invention, therefore, the bicycle can be driven with stepless variable speeds automatically.

FIGS. 9-12 illustrate further embodiments of the invention, wherein like components have been designated by the same reference numerals as in the previous embodiment.

Figure 9:
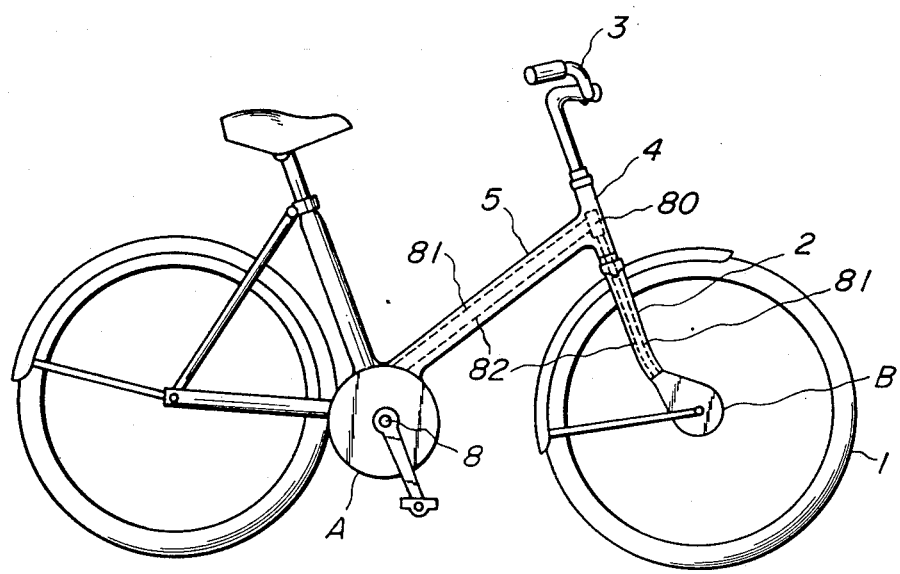
FIG. 9 is a side view of another embodiment of the bicycle according to the invention.

FIG. 9 illustrates a bicycle applied with the present invention whose front wheel is driving one. A hydraulic motor B is located at the front wheel 1 and a swivel joint 80 (a rotary universal joint for oil passage) is provided in a head tube 4 for connecting a hydraulic pump A located at a crankshaft 8 with the hydraulic motor B through delivery hydraulic passages 81 and suction hydraulic passages 82. These passages 81 and 82 may be provided in a down tube 5 and fork blades 2, repectively. Instead of the swivel joint 80, a flexible hose (not shown) may be used.

In this manner, the front wheel driving can be easily realized, which was very difficult in cahin drive bicycles of the prior art. The front drive bicycle will be very powerful to an extent that rear wheel drive bicycles could not achieve, particularly in cross-country cycling or mountain cycling which has become popular recently.

FIG. 10 illustrates a front and rear wheel drive bicycle equipped with hydraulic motors B at front and rear wheels 1 and 13 and a hydraulic pump A provided with a three-way valve 83 at a crankshaft 8. The hydraulic motor B at the rear wheel is connected to the hydraulic pump A through a connecting member 15 and the three-way valve 83. The hydraulic motor B at the front wheel is connected to the hydraulic pump A through a swivel joint 80 in a head tube 4, the three-way valve 83 and oil passages 81 and 82.

FIGS. 11a, 11b and 11c illustrate switching over the three-way valve 83. In the position of the three-way valve 83 shown in FIG. 11a, the front and rear wheels are hydraulically driven. Only the rear wheel is driven in the position of the three-way valve 83 shown in FIG. 11b and only the front wheel is driven in the position of the valve shown in FIG. 11c.

With this arrangement, driving systems to meet all driving situations of the bicycle can be obtained by switching-over operation of one valve, so that it is very convenient for multipurpose bicycles.

FIG. 12 illustrates a bicycle with a small engine equipped with the transmission according to the invention. The bicycle comprises a small engine 84, a driving pulley 85 provided on an output shaft of the engine, a driven pulley 86 provided on a crankshaft 8 and a V-belt extending about these pulleys 85 and 86.

In this manner, the present invention is applicable to a power-driven two-wheeled vehicle. In this case, the automatic stepless speed change as above described is also effected, so that the invention has very wide applications.

As can be seen from the above description, the invention has the following many advantages.

(a) The stepless speed change of two-wheeled vehicle can be effected with easily. The transmission is hydraulically carried out to eliminate noise and pulsation in transmission system, thereby providing a two-wheeled vehicle comfortable in riding.

(b) Rotating ratio of the driving wheel to the crankshaft can be changed in a stepless manner from the set maximum value 1:3 to 1:0. Accordingly, the range of speed change is very wide.

(c) In addition to the stepless speed changing, the automatic speed change dependent upon loads can be realized with very simple means as above described, thereby greatly improving the performance and steering of bicycles.

(d) The sprockets and chains required in transmission systems of the prior art bicycle are not needed, there is no trouble such as jamming of clothing with the sprocket and chain. The external appearance becomes simple and attractive.

(e) The front wheel driving which is very difficult in chain drive bicycles of the prior art can be easily realized. In connection therewith, the performance of two-wheeled vehicle can be considerably improved.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A two-wheeled vehicle comprising:
  a driving system having an input portion and an output portion;
  a variable displacement fluid pump provided at said input portion of the driving system, said variable displacement fluid pump being a radial plunger pump whose plungers are driven by a cam assembly, an eccentricity of said cam assembly being adjustable, said cam assembly comprising:
    an inner eccentric cam substantially in the shape of a cylinder eccentrically fixed to a center shaft and an outer eccentric cam substantially in the shape of a cylinder snuggly, rotatably and eccentrically fitted on the inner eccentric cam;
  said plunger pump comprising:
    eccentricity control means for changing the eccentricity of the eccentric cam assembly, said eccentricity control means comprising:
      an inner internal gear integral with said inner eccentric cam and having a center coincident with said center shaft;
      an outer internal gear rotatable together with said outer eccentric cam and having the same number of teeth and the same pitch diameter as those of said inner internal gear and located side-by-side, concentric to, and rotatable relative to said inner internal gear;
      a center gear rotatable on said center shaft;
      a fixed gear rotatable on a fixed member and meshing with said center gear and one of said internal gears; and
      a rocking gear rotatable on a free end of a rocking arm which is rotatably supported by said center shaft and meshes with said center gear and the other of said internal gears, thereby adjusting the eccentricity of said eccentric cam assembly in a stepless manner by rocking said rocking arm; and
  a fixed displacement fluid motor provided at said output portion of the driving system, said fluid pump and motor being connected through hydraulic passages, thereby driving the vehicle.

2. A two-wheeled vehicle as set forth in claim 1, wherein said plunger pump includes radial cylinder bores in which said plungers reciprocally moves, each said bore communicating with suction and delivery hydraulic passages of the pump through check valves.

3. A two-wheeled vehicle as set forth in claim 1, whereins said outer internal gear is formed integrally with a disc which is formed with a groove, and said outer eccentric cam is formed with a projection which is slidably fitted with said groove of the disc with clearances.

4. A two-wheeled vehicle as set forth in claim 1, wherein said adjustment of the eccentricity is effected in connection with delivery pressure of said hydraulic pump.

5. A two-wheeled vehicle as set forth in claim 1, wherein there is provided a piston cylinder assembly comprising a cylinder whose head is pivotally connected to a frame and supplied with hydraulic pressure from said variable displacement hydraulic pump, a piston slidable in the cylinder by the hydraulic pressure from the pump, a piston rod connected to the piston, and a spring for returning the piston moved by the hydraulic pressure, and an extended end of said piston rod being connected to said arm such that the arm is moved by the piston rod moved by the hydraulic pressure.

6. A two-wheeled vehicle as set forth in claim 1, wherein said fixed displacement fluid pump is a gear pump including a pair of gears.

7. A two-wheeled vehicle as set forth in claim 6, wherein a pitch diameter of one of said gears is larger than that of the other of said gears, and said gear motor comprises a gear casing integrally formed at a center with a shaft sleeve which is fixedly fitted on a driving wheel spindle and a one-way clutch for connecting said driving wheel spindle to an output shaft of said large diameter gear.

8. A two-wheeled vehicle as set forth in claim 1, wherein said variable displacement fluid pump is provided at a crankshaft and said fixed displacement fluid motor is provided at a front wheel spindle of the two-wheeled vehicle.

9. A two-wheeled vehicle as set forth in claim 1, wherein said variable displacement fluid pump is provided at a crankshaft and two said fixed displacement fluid motor are provided at front and rear wheel spindles of the two wheeled vehicle.

10. A two-wheeled vehicle as set forth in claim 9, wherein a three-way valve is provided in said hydraulic passages to select any one of front wheel, rear wheel and both wheel drive.

* * * * *